United States Patent
Chen et al.

(10) Patent No.: US 11,495,191 B2
(45) Date of Patent: Nov. 8, 2022

(54) READING EXTENDED DISPLAY IDENTIFICATION DATA (EDID) FROM DISPLAY DEVICE TO GET NATIVE RESOLUTION OF DISPLAY DEVICE

(71) Applicant: Wistron Corporation, New Taipei (TW)

(72) Inventors: Feng-Yuan Chen, New Taipei (TW); Chou-Chieh Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 37 days.

(21) Appl. No.: 16/706,794

(22) Filed: Dec. 8, 2019

(65) Prior Publication Data

US 2021/0065651 A1 Mar. 4, 2021

(30) Foreign Application Priority Data

Aug. 27, 2019 (TW) ................. 108130530

(51) Int. Cl.
  *G09G 5/00* (2006.01)
  *G06T 1/60* (2006.01)
(52) U.S. Cl.
  CPC ............... *G09G 5/006* (2013.01); *G06T 1/60* (2013.01); *G09G 5/005* (2013.01)
(58) Field of Classification Search
  CPC ........... G09G 5/005; G09G 5/006; G06T 1/60
  See application file for complete search history.

(56) References Cited

U.S. PATENT DOCUMENTS

| 2011/0277011 A1* | 11/2011 | Suzuki | H04B 10/25 725/149 |
| 2014/0371892 A1* | 12/2014 | Takahashi | H04N 21/43635 700/94 |
| 2018/0047132 A1* | 2/2018 | Lu | G06F 3/0638 |

FOREIGN PATENT DOCUMENTS

| CN | 103489426 | 3/2016 |
| CN | 107728972 A | 2/2018 |
| TW | 201823924 A | 7/2018 |

* cited by examiner

*Primary Examiner* — Kent W Chang
*Assistant Examiner* — Jonathan M Cofino
(74) *Attorney, Agent, or Firm* — Winston Hsu

(57) ABSTRACT

A display device, an electronic system and a control method are disclosed. The display device includes a memory device. The memory device includes a memory array, an input/output logic circuit and a control logic circuit. The memory array includes a plurality of sub-arrays and each sub-array stores extended display identification data. The input/output logic circuit is configured to receive an identification data request from a host device and determine whether to perform an identification data access process according to the identification data request The control logic circuit is configured to read extended display identification data stored in a target sub-array of the plurality of sub-arrays of the memory array according to memory address information in response to determining to perform the identification data access process.

7 Claims, 4 Drawing Sheets

READING EXTENDED DISPLAY IDENTIFICATION DATA (EDID) FROM DISPLAY DEVICE TO GET NATIVE RESOLUTION OF DISPLAY DEVICE

BACKGROUND OF THE INVENTION

1. Field of the Invention

The present invention relates to a display device, an electronic system and a control method, and more particularly, to a display device, an electronic system and a control method capable of simplifying circuit design and avoiding abnormality caused by capacitive effect.

2. Description of the Prior Art

In general, when a video source device is connected to a display device, the video source device can read extended display identification data (EDID) from the display device to get a native resolution of the display device. After that, the video source device provides display images consistent with the native resolution to the display device for display according to the obtained EDID. The EDID is often stored in an electrically erasable programmable read only memory (EEPROM).

According to the user's requirements, different native resolutions may be applied in different display modes. In the conventional display device, multiple EDID with different native resolutions may usually be stored in multiple memory devices respectively. The conventional display device may call and access a respective memory device of the multiple memory devices to obtain the EDID storing the corresponding native resolution based on practical requirements. Please refer to FIG. 1, which is a schematic diagram of a conventional electronic system 1. The electronic system 1 includes a host device 10 and a display device 12. The display device 12 includes a controller 120 and memory devices 122, 124, 126 and 128. The memory devices 122, 124, 126 and 128 are EEPROMs. Extended display identification data EDID1 is stored in the memory device 122. Extended display identification data EDID2 is stored in the memory device 124. Extended display identification data EDID3 is stored in the memory device 126. Extended display identification data EDID4 is stored in the memory device 128. The host device 10 communicates with the memory devices 122, 124, 126 and 128 through an inter-integrated circuit (I²C) bus interface. Under different display modes, the host device 10 accesses extended display identification data stored in a fixed device address of the corresponding memory device through the I²C bus command. That is, the host device 10 may call the corresponding memory device through the I²C bus command and provide a fixed device address for accessing the extended display identification data. However, while using multiple memory devices (such like the memory devices 122, 124, 126 and 128 shown in FIG. 1), the circuit design would become very complicated. Further, parasitic (stray) capacitance effects between the circuit board and those memory devices can easily cause erroneous signal transmission, thereby resulting in abnormal transmission interface test or functional failure. Thus, there is a need for improvement over the prior art

SUMMARY OF THE INVENTION

It is therefore a primary objective of the present invention to provide a display device, an electronic system and a control method capable of simplifying circuit design and avoiding abnormality caused by capacitive effect, in order to resolve the aforementioned problems.

According to an embodiment of the present invention, a display device is disclosed. The display device comprises a memory device, comprising: a memory array comprising a plurality of sub-arrays and each sub-array storing extended display identification data; an input/output logic circuit configured to receive an identification data request from a host device and determine whether to perform an identification data access process according to the identification data request; and a control logic circuit configured to read extended display identification data stored in a target sub-array of the plurality of sub-arrays of the memory array according to memory address information in response to determining to perform the identification data access process.

According to another embodiment of the present invention, a control method of a display device is disclosed. The control method of a display device comprises a memory device, the memory device comprising a memory array comprising a plurality of sub-arrays, each sub-array storing extended display identification data, the control method comprising: receiving an identification data request from a host device; determining whether to perform an identification data access process according to the identification data request; and reading extended display identification data stored in a target sub-array of the plurality of sub-arrays of the memory array according to memory address information in response to determining to perform the identification data access process.

According to another embodiment of the present invention, an electronic system is disclosed. The electronic system comprises a host device, configured to transmit an identification data request; and a memory device, comprising: a memory array comprising a plurality of sub-arrays and each sub-array storing extended display identification data; an input/output logic circuit configured to receive the identification data request and determine whether to perform an identification data access process according to the identification data request; a control logic circuit configured to read extended display identification data stored in a target sub-array of the plurality of sub-arrays of the memory array according to memory address information in response to determining to perform the identification data access process; and a controller configured to provide the memory address information.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
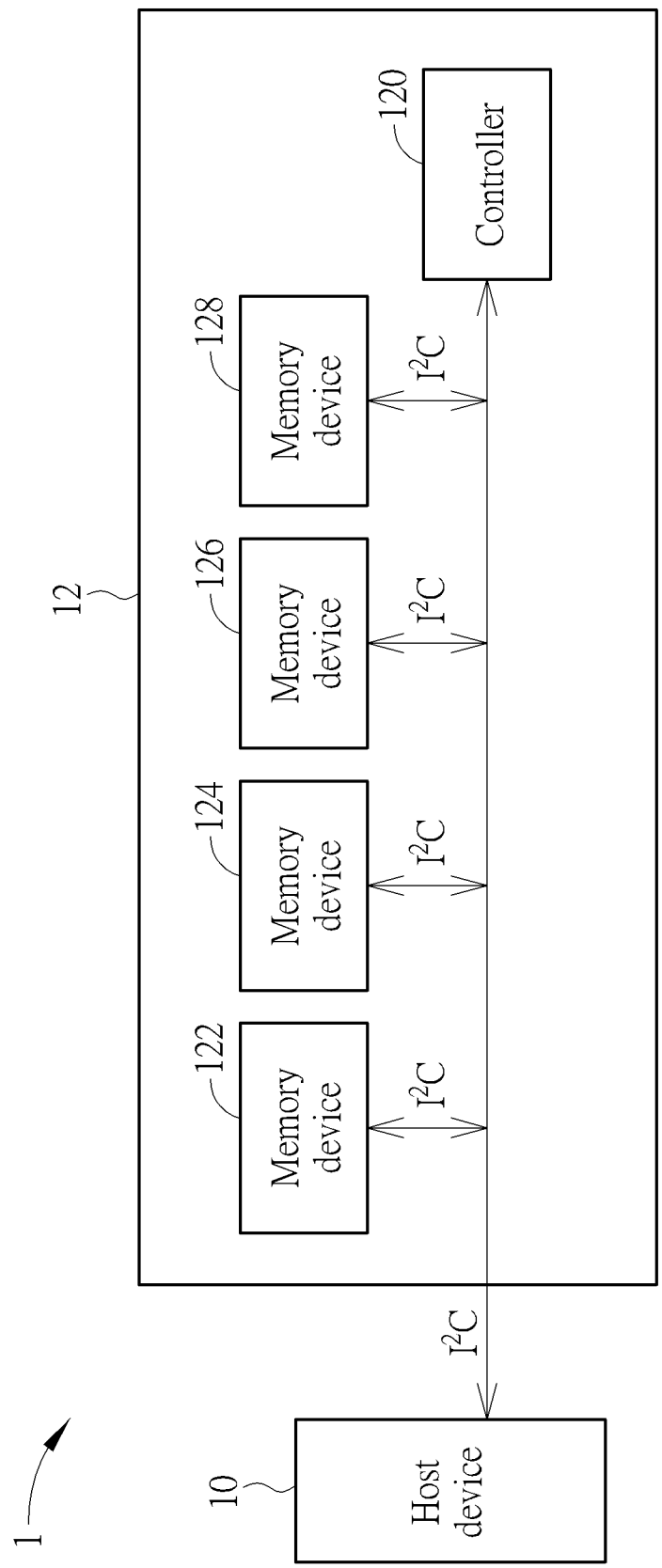
FIG. 1 is a schematic diagram of a conventional electronic system according to the prior art.
Figure 2:
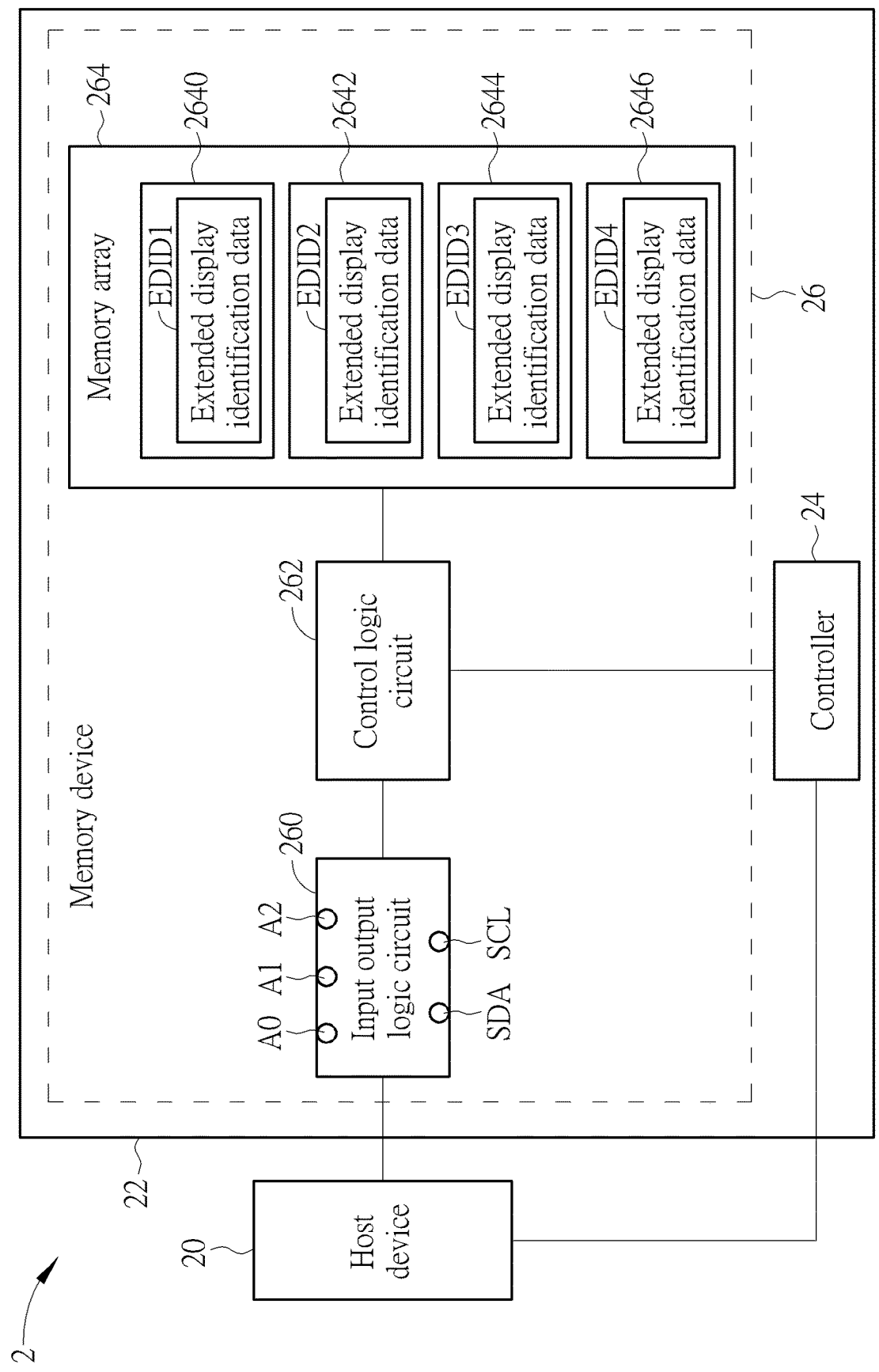
FIG. 2 is a schematic diagram of an electronic system according to an embodiment of the present invention.

Please refer to FIG. 2, which is a schematic diagram of an electronic system 2 according to an embodiment of the present invention. The electronic system 2 includes a host device 20 and display device 22. The host device 20 can be a desktop computer, a server computer, a notebook, a storage system, a mobile communication device, a wearable device or an embedded system product, but not limited thereto. The host device 20 and the display device 22 can communicate through a data transmission interface. For example, the host device 20 can utilize transmission interface technologies, such as inter-integrated circuit ($I^2C$) bus interface, universal asynchronous receiver/transmitter (UART) interface, serial peripheral interface (SPI), universal serial bus (USB) interface, controller area network bus (CAN bus) interface or any other transmission interface, to communicate with the display device 22 for signal transmission, but not limited thereto. In an embodiment, the electronic system 2 can be applied to signal transmissions of an $I^2C$ bus interface. The host device 20 and the display device 22 can communicate through the $I^2C$ bus interface.

The display device 22 includes a controller 24 and a memory device 26. The controller 24 is configured to provide memory address information. The controller 24 may be a scalar or a timing controller (T-con), but not limited thereto. The memory address information includes at least one of an access address, a related index of access address, an offset of access address and a length of access address. The memory address information can be utilized for indicating the location where the extended display identification data is stored in the sub-array of the memory array 264. The controller 24 can determine and select the extended display identification data stored in the sub-arrays of the memory array 264 according to the currently applied display mode for providing memory address information.

The memory device 26 includes an input/output logic circuit 260, a control logic circuit 262 and a memory array 264. The memory array includes sub-arrays 2640, 2642, 2644 and 2646. Each sub-array stores extended display identification data (EDID). For example, the sub-array 2640 stores extended display identification data EDID1, the sub-array 2642 stores extended display identification data EDID2, the sub-array 2644 stores extended display identification data EDID3 and the sub-array 2646 stores extended display identification data EDID4. Each sub-array has a corresponding array address and array index. The extended display identification data may include basic parameters of the display device 22, such as manufacturer name, product serial number, product model number, standard display mode and related parameters, supported resolution, but not limited thereto. The memory device 26 can be a non-volatile memory, but not limited thereto. For example, the memory device 26 can be an electrically-erasable programmable read-only memory (EEPROM) or a flash read only memory (Flash ROM). The input/output logic circuit 260 is configured to receive an identification data request from the host device 20 and determine whether to perform an identification data access process according to the identification data request. The control logic circuit 262 is coupled to the input/output logic circuit 260 and the memory array 264. When the input/output logic circuit 260 determines to perform an identification data access process, the control logic circuit 262 reads extended display identification data stored in a target sub-array of the sub-arrays 2640, 2642, 2644 and 2646 of the memory array 264 according to memory address information and provides the read extended display identification data to the host device 20.

The controller 24 and the memory device 26 can be, respectively, a single independent integrated circuit device. The controller 24 and the memory device 26 can also be disposed in a single integrated circuit device. For example, the controller 24 and the memory device 26 are in the same package structure. In addition, the control logic circuit 262 further includes an input pin (not shown in figures) for inputting the memory address information. As a result, the user can set which extended display identification data of the sub-arrays in the memory array is to be accessed and input the corresponding memory address information by using the input pin according to practical requirements, thus proving a more flexible option to apply various display mode settings.

Figure 3:
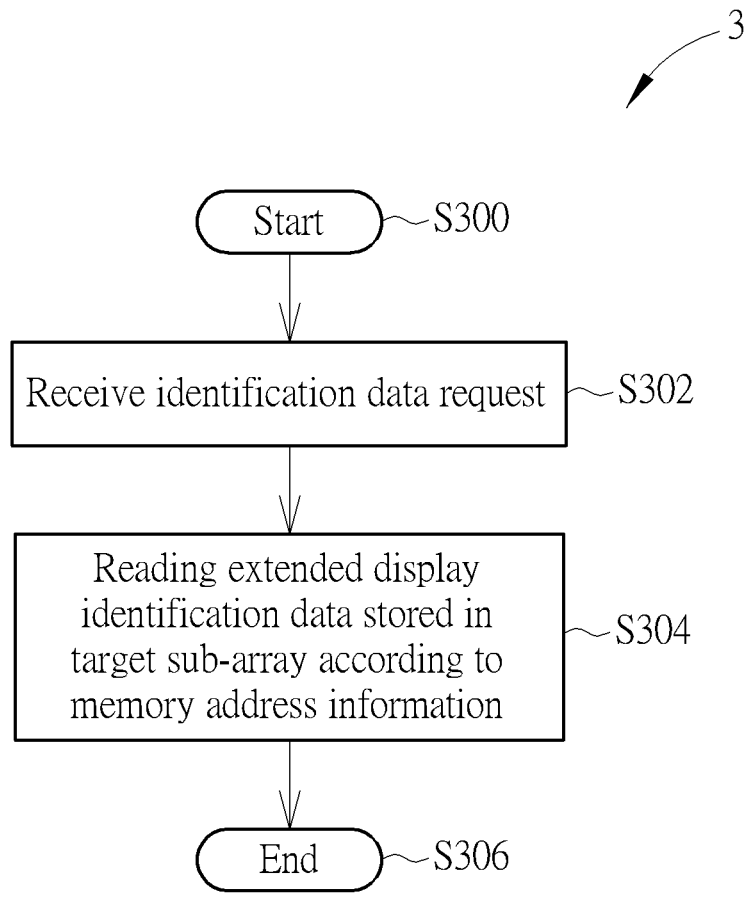
FIG. 3 is a flow diagram of a procedure according to an embodiment of the invention.

For an illustration of the operations of the electronic system 2, please refer to FIG. 3. FIG. 3 is a flow diagram of a procedure 3 according to an embodiment of the present invention. The flowchart in FIG. 3 mainly corresponds to the operations on the electronic system 2 shown in FIG. 2. The procedure 3 includes the following steps:

Step S300: Start.
Step S302: Receive identification data request.
Step S304: Read extended display identification data stored in target sub-array according to memory address information.
Step S306: End.

According to the procedure 3, in Step S302, the electronic system 2 can be applied to signal transmissions of an $I^2C$ bus interface. The host device 20 and the display device 22 can communicate through the $I^2C$ bus interface. For example, the host device 20 can communicate with the memory device 26 via the $I^2C$ bus interface. The controller 24 can communicate with the memory device 26 via the $I^2C$ bus interface. Each device on the $I^2C$ bus interface has a unique device address. According to different requirements, each device on the $I^2C$ bus interface can be a transmitter or a receiver. The display device 22 can support a display data channel (DDC) standard function. When the host device 20 is connected to the display device 22, the host device 20 transmits an identification data request. Under such a situation, when the display device 22 is powered, electrical power is supplied to a display data channel interface of the display device 22 or the display device 22 is performing a display data channel, the input/output logic circuit 260 is configured to receive the identification data request from the host device 20 and determine whether to perform an identification data access process according to the identification data request.

The identification data request includes a device selection address. The input/output logic circuit 260 receives the identification data request and compares the device selection address of the identification data request with a device address of the memory device 26. When the device selection address of the identification data request matches the device address of the memory device 26, the input/output logic circuit 260 determines to perform an identification data access process. For example, suppose the device address of the memory device 26 is "10100000". As shown in FIG. 2, the input/output logic circuit 260 includes pins SDA and SDL. The pins SDA and SDL can be utilized to receive signals from the host device 20 and transmit signals to the host device 20. If the device selection address of the identification data request received via the pins SDA and SDL of the input/output logic circuit 260 is "10100000", the input/output logic circuit 260 compares the received device selection address with the device address of the memory device 26 and determines that the received device selection address matches the device address of the memory device 26. This means that the memory device 26 is selected, and the host device 20 wants to communicate with the memory device 26. In addition, when determining that the received device selection address matches the device address of the memory device 26, the input/output logic circuit 260 can transmit an acknowledgment signal to the host device 20 in response to the identification data request.

On the other hand, when the device selection address of the identification data request received via the pins SDA and SDL of the input/output logic circuit 260 is not "10100000", the input/output logic circuit 260 compares the received device selection address with the device address of the memory device 26 and determines that the received device selection address does not match the device address of the memory device 26. As such, the memory device 26 neglects the identification data request and does not take additional actions. In addition, as shown in FIG. 2, the input/output logic circuit 260 includes pins A0, A1 and A2. The pins A0, A1 and A2 can be utilized for setting the device address, so as to provide the user with flexible adjustments according to practical demands.

In Step S304, when the input/output logic circuit 260 determines to perform an identification data access process, the control logic circuit 262 is configured to read extended display identification data stored in a target sub-array of the sub-arrays 2640, 2642, 2644 and 2646 according to the memory address information. The memory address information indicates the location storing the extended display identification data in the target sub-array. Moreover, the controller 24 can determine which extended display identification data storing in the sub-array is selected according to the user's display mode and provide the corresponding memory address information to the control logic circuit 262.

The controller 24 can select extended display identification data of a target sub-array from the sub-arrays 2640, 2642, 2644 and 2646 of the memory array 264 and provide location information (e.g., memory address information) indicating the location where the extended display identification data of the target sub-array has been stored to the control logic circuit 262. Therefore, the controller 24 can set the corresponding memory address information according to different display modes in order to provide to the control logic circuit 262 and accordingly, the control logic circuit 262 can read extended display identification data stored in the target sub-array of the sub-arrays 2640, 2642, 2644 and 2646 according to the memory address information. In addition, the display device 22 further includes a storage device (not shown in figures). The controller 24 can set corresponding extended display identification data according to the required display mode and store the corresponding memory address information corresponding to the set extended display identification data into the above-mentioned storage device of the display device 22 before the display device 22 is powered off last time. As a result, when the host device 20 is connected to the display device 22, and the controller 24 is not powered on and unable to operate, the control logic circuit 262 can detect the above-mentioned storage device and read the memory address information from the above-mentioned storage device so as to perform the read operation of the extended display identification data.

Moreover, when the input/output logic circuit 260 determines to perform an identification data access process, the control logic circuit 262 can detect and obtain the memory address information provided by the controller 24. The control logic circuit 262 can select the target sub-array from the sub-arrays 2640, 2642, 2644 and 2646 of the memory array 264 and read the extended display identification data stored in the target sub-array according to the memory address information. When the memory device 26 reads the extended display identification data stored in a target sub-array of the sub-arrays 2640, 2642, 2644 and 2646, the extended display identification data read from the target sub-array can be provided to the host device 20. Therefore, the host device 20 can process image signals into corresponding display image signals according to the extended display identification data read from the target sub-array and further provide the corresponding display image signal to the display device 22 for display.

For example, during a normal image display mode, the required native resolution of the display device 22 is 3840×2160. During a picture by picture (PBP) mode, the required native resolution is 1920×2160. Suppose a resolution recorded in a first detailed timing descriptor block (DTDB 1) of extended display identification data EDID 1 (e.g., bytes 54-71 of the extended display identification data EDID 1) of the sub-array 2640 of the memory array 264 is 3840×2160. A resolution recorded in a first detailed timing descriptor block (DTDB 1) of extended display identification data EDID 2 (e.g., bytes 54-71 of the extended display identification data EDID 2) of the sub-array 2642 of the memory array 264 is 1920×2160. A resolution recorded in a first detailed timing descriptor block (DTDB 1) of extended display identification data EDID 3 (e.g., bytes 54-71 of the extended display identification data EDID 3) of the sub-array 2644 of the memory array 264 is 3840×1080. A resolution recorded in a first detailed timing descriptor block (DTDB 1) of extended display identification data EDID 4 (e.g., bytes 54-71 of the extended display identification data EDID 4) of the sub-array 2646 of the memory array 264 is 1920×1080.

In an embodiment, when the display device 22 operates in a normal image display mode for displaying normal images, the controller 24 can select the sub-array 2640 from the sub-arrays 2640, 2642, 2644 and 2646 of the memory array 264 and provide a memory address (i.e. memory address information) indicating the location where the extended display identification data EDID1 of the sub-array 2640 has been stored to the control logic circuit 262. When the input/output logic circuit 260 determines to perform an identification data access process, the control logic circuit 262 can detect and obtain the memory address information (e.g., the memory address indicating the location where the extended display identification data EDID1 of the sub-array 2640 has been stored) provided by the controller 24. The control logic circuit 262 can select the sub-array 2640 from the sub-arrays 2640, 2642, 2644 and 2646 for acting as the target sub-array and read the extended display identification data EDID1 stored in the sub-array 2640 according to the memory address information. The extended display identification data EDID1 read from the sub-array 2640 can be provided to the host device 20 by the control logic circuit 262. Therefore, the host device 20 can read the resolution data (3840×2160) recorded in bytes 54-71 of the extended display identification data EDID1 and generate the corresponding display image signals to the display device 22 for display according to the resolution data recorded in bytes 54-71 of the extended display identification data EDID1.

In another embodiment, when the display device 22 operates in a PBP mode for displaying PBP images, the controller 24 can select the sub-array 2642 from the sub-arrays 2640, 2642, 2644 and 2646 of the memory array 264 and provide a memory address (i.e. memory address information) indicating the location where the extended display identification data EDID2 of the sub-array 2642 has been stored to the control logic circuit 262. When the input/output logic circuit 260 determines to perform an identification data access process, the control logic circuit 262 can detect and obtain the memory address information (e.g., the memory address indicating the location where the extended display identification data EDID2 of the sub-array 2642 has been stored) provided by the controller 24. The control logic circuit 262 can select the sub-array 2642 from the sub-arrays 2640, 2642, 2644 and 2646 for acting as the target sub-array and read the extended display identification data EDID2 stored in the sub-array 2642 according to the memory address information. The extended display identification data EDID2 read from the sub-array 2642 can be provided to the host device 20 by the control logic circuit 262. As such, the host device 20 can read the resolution data (1920×2160) recorded in bytes 54-71 of the extended display identification data EDID2 and generate the corresponding display image signals to the display device 22 for display according to the resolution data recorded in bytes 54-71 of the extended display identification data EDID2. Since the display device 22 has switched to the correct image resolution, the displayed image will be not distorted when displaying the PIP images.

Figure 4:
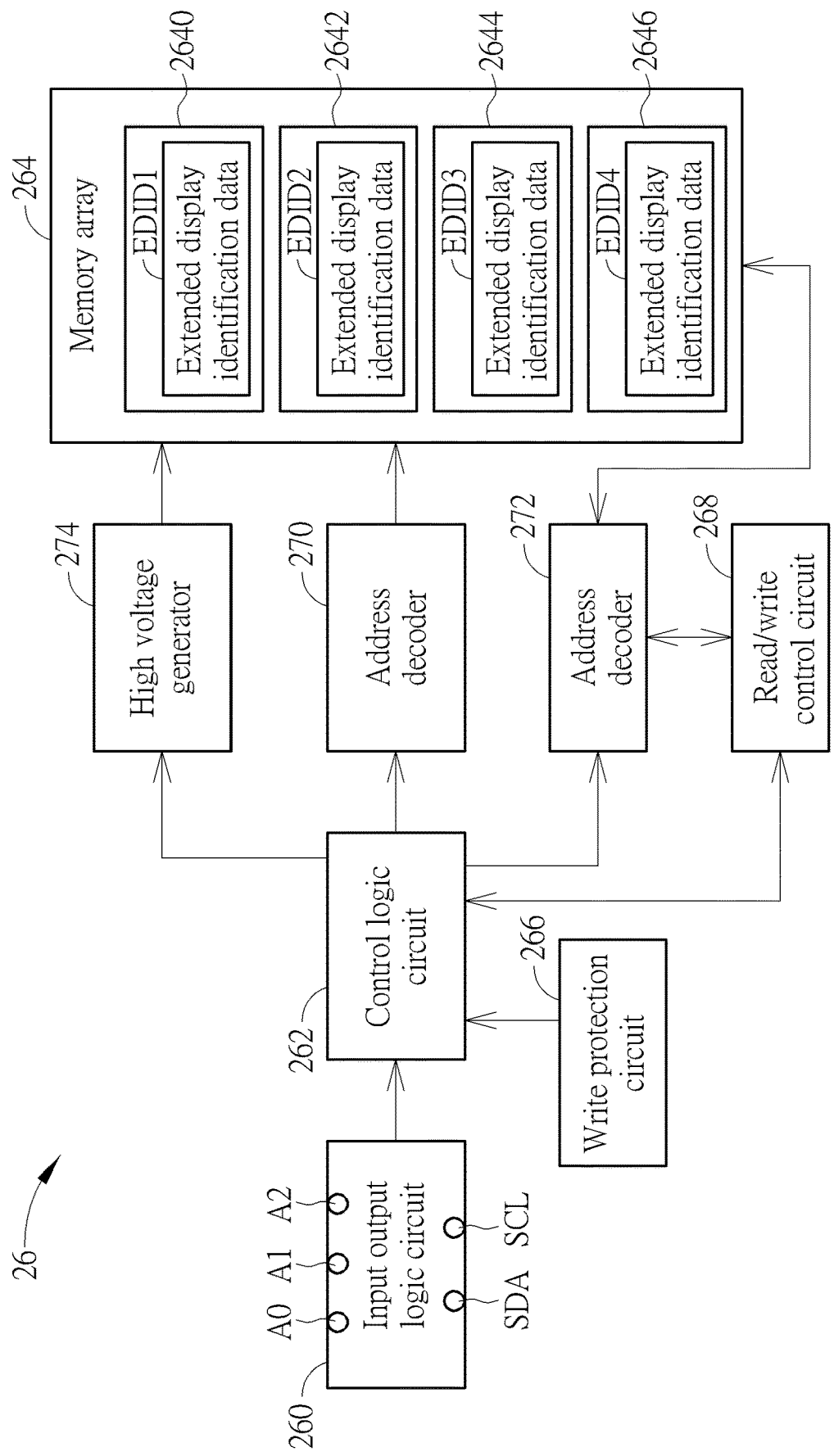
FIG. 4 is a schematic diagram of the memory device shown in FIG. 2 according to an embodiment of the invention.

As to read EDID stored in a target sub-array of the memory array 264 according to the memory address information by the control logic circuit 262, please refer to FIG. 4. FIG. 4 is a schematic diagram of the memory device shown in FIG. 2 according to an embodiment of the invention. As shown in FIG. 4, the memory device 26 further includes a write protection circuit 266, a read/write control circuit 268, address decoders 270 and 272, and a high voltage generator 274. The write protection circuit 266 is configured to perform a write protection function. When the write protection circuit 266 activates the write protection function, the memory device 26 can only perform read operations, but are not allowed to perform write operations. When the write protection function is inactivated by the write protection circuit 266, the memory device 26 can perform read or write operations. The address decoders 270 and 272 can decode read or write address. The high voltage generator 274 can generate high voltage signals. When the control logic circuit 262 obtains the memory address information, the address decoders 270 and 272 can decode the memory address information and accordingly output the read address. The write protection circuit 266 activates the write protection function. The read/write control circuit 268 controls the read operation. As a result, the corresponding EDID can be read from the target sub-array of the memory array 264.

In summary, as the host device 20 transmits the same identification data request (including the same device selection address), the single memory device of the embodiments can reply different extended display identification data according to the setting of the controller 24 when receiving the same identification data request, so as to meet the needs of different display modes. In other words, the embodiments of the invention utilize single memory device storing multiple sets of extended display identification data and emulates multiple memory device function by using single memory device, thus effectively simplifying circuit design, reducing manufacturing costs and avoiding the problem of abnormal transmission or functional failure due to capacitance effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device, comprising:
a memory device, comprising:
a memory array comprising a plurality of sub-arrays and each sub-array storing extended display identification data;
an input/output logic circuit configured to receive an identification data request comprising a device selection address from a host device, determine whether to perform an identification data access process according to the identification data request, compare the device selection address of the identification data request with a device address of the memory device, and determine to perform the identification data access process when the device selection address of the identification data request matches the device address of the memory device;
a controller configured to determine a target sub-array from the plurality of sub-arrays of the memory array according to a display mode of the display device and provide memory address information including a memory address of the target sub-array; and
a control logic circuit configured to read extended display identification data stored in the target sub-array of the plurality of sub-arrays of the memory array according to the memory address information including the memory address of the target sub-array in response to determining to perform the identification data access process.

2. The display device of claim 1, wherein in response to determining to perform the identification data access process, when the display device operates in a first display mode, the controller determines a first sub-array of the plurality of sub-arrays as the target sub-array and provides the memory address information including a memory address of the first sub-array to the control logic circuit, such that the control logic circuit reads the extended display identification data stored in the first sub-array of the memory array according to the memory address information including the memory address of the first sub-array, when the display device operates in second display mode, the controller determines a second sub-array of the plurality of sub-arrays as the target sub-array and provides the memory address information including a memory address of the second sub-array to the control logic circuit, such that the control logic circuit reads the extended display identification data stored in the second sub-array the memory array according to the memory address information including the memory address of the second sub-array.

3. The display device of claim 1, wherein the memory device is an electrically erasable programmable read only memory.

4. A control method of a display device, the display device comprising a memory device, the memory device comprising a memory array comprising a plurality of sub-arrays, each sub-array storing extended display identification data, the control method comprising:
    receiving an identification data request from a host device;
    determining whether to perform an identification data access process according to the identification data request, wherein the identification data request comprises a device selection address and the step comprising:
        comparing the device selection address of the identification data request with a device address of the memory device; and
        determining to perform the identification data access process when the device selection address of the identification data request matches the device address of the memory device;
    determining a target sub-array from the plurality of sub-arrays of the memory array according to a display mode of the display device and providing memory address information including a memory address of the target sub-array; and
    reading extended display identification data stored in the target sub-array of the plurality of sub-arrays of the memory array according to memory address information including the memory address of the target sub-array in response to determining to perform the identification data access process.

5. The control method of claim 4, wherein the steps of determining the target sub-array from the plurality of sub-arrays of the memory array according to the display mode of the display device and providing memory address information including the memory address of the target sub-array and reading the extended display identification data stored in the target sub-array of the plurality of sub-arrays of the memory array according to the memory address information in response to determining to perform the identification data access comprising:
    in response to determining to perform the identification data access process, when the display device operates in a first display mode, determining a first sub-array of the plurality of sub-arrays as the target sub-array and providing the memory address information including a memory address of the first sub-array and reading the extended display identification data stored in the first sub-array of the memory array according to the memory address information including the memory address of the first sub-array; and
    when the display device operates in second display mode, determining a second sub-array of the plurality of sub-arrays as the target sub-array and providing the memory address information including a memory address of the second sub-array and reading the extended display identification data stored in the second sub-array the memory array according to the memory address information including the memory address of the second sub-array.

6. The control method of claim 4, wherein the memory device is an electrically erasable programmable read only memory.

7. An electronic system, comprising:
    a host device configured to transmit an identification data request; and
    a display device, comprising:
        a memory device, comprising:
            a memory array comprising a plurality of sub-arrays and each sub-array storing extended display identification data;
            an input/output logic circuit configured to receive the identification data request comprising a device selection address from the host device, determine whether to perform an identification data access process according to the identification data request, compare the device selection address with a device address of the memory device and determine to perform an identification data access process when the device selection address of the identification data request matches the device address of the memory device; and
            a control logic circuit configured to read extended display identification data stored in a target sub-array of the plurality of sub-arrays of the memory array according to memory address information including a memory address of a target sub-array in response to determining to perform the identification data access process; and
        a controller configured to determine the target sub-array from the plurality of sub-arrays of the memory array according to a display mode of the display device and provide the memory address information including the memory address of the target sub-array to the control logic circuit, such that the control logic circuit reads the extended display identification data stored in the target sub-array of the plurality of sub-arrays of the memory array according to the memory address information including the memory address of the target sub-array.

\* \* \* \* \*